(No Model.) 4 Sheets—Sheet 1.

E. A. & F. M. JEFFERY.
SPRING BED OR BED BOTTOM.

No. 332,081. Patented Dec. 8, 1885.

WITNESSES:
E. B. Bolton
Geo. Quinton

INVENTORS:
Edwin A. Jeffery and
Frank M. Jeffery
By their Attorneys,
Burke, Fraser & Connells

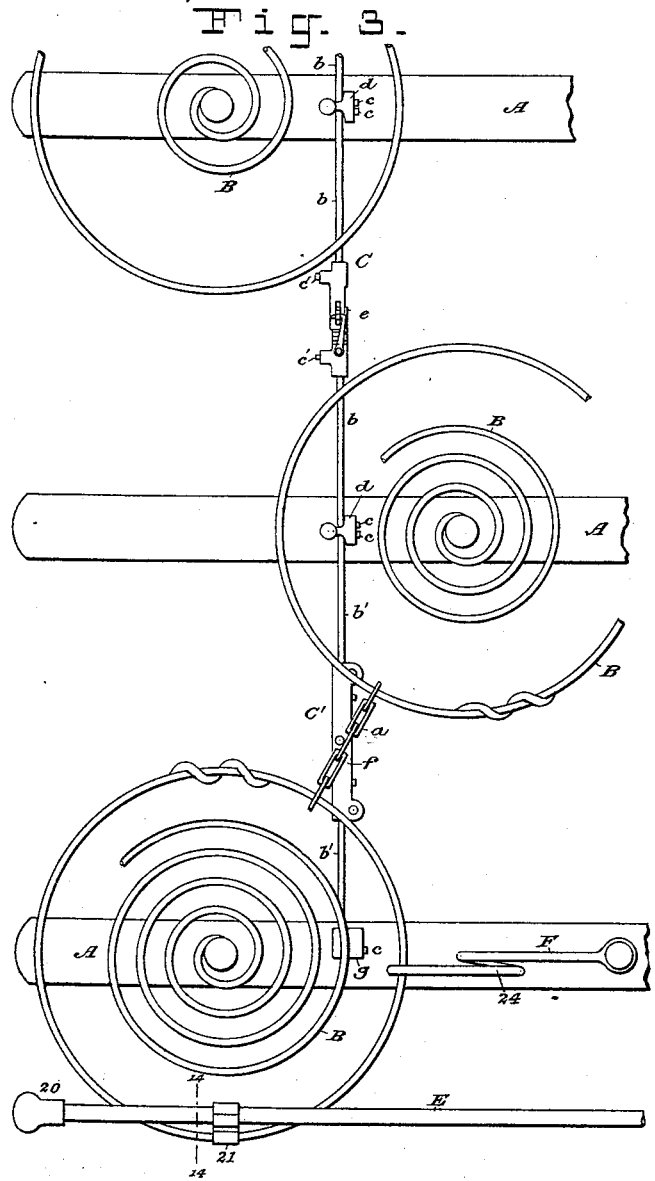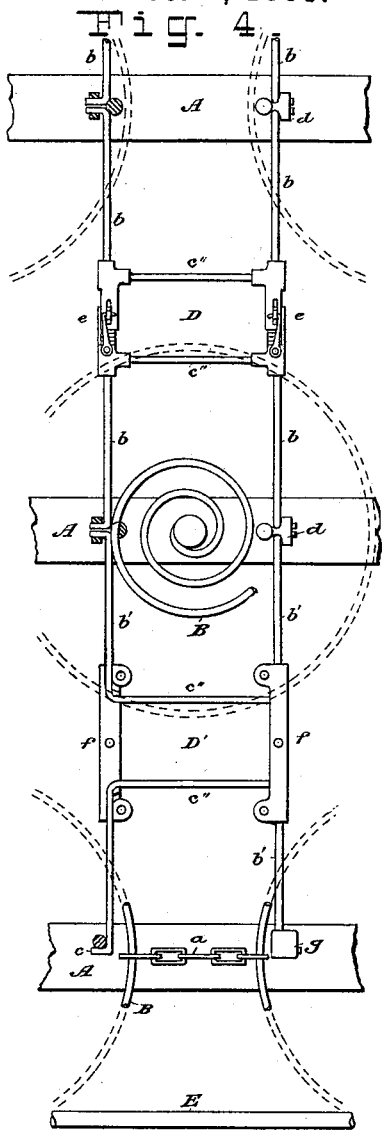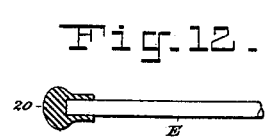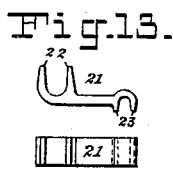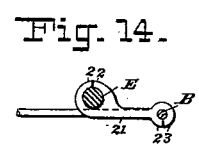

(No Model.) 4 Sheets—Sheet 3.
E. A. & F. M. JEFFERY.
SPRING BED OR BED BOTTOM.
No. 332,081. Patented Dec. 8, 1885.
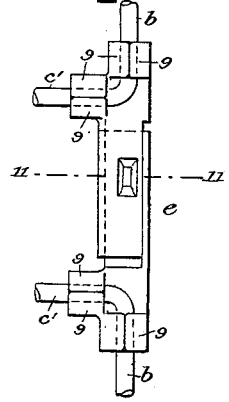
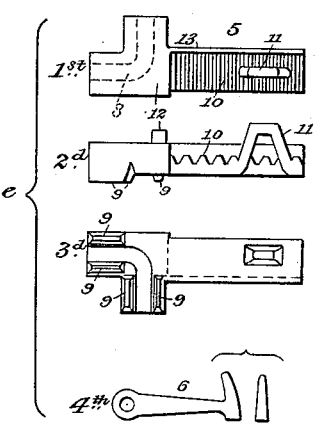
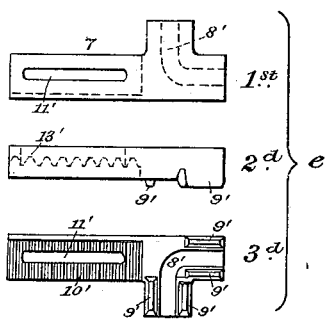
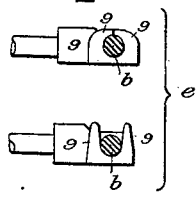
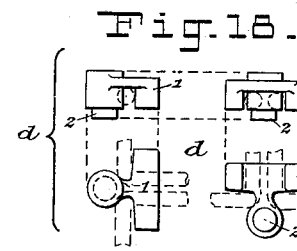
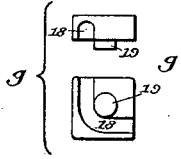
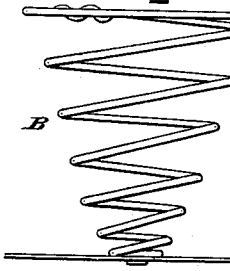
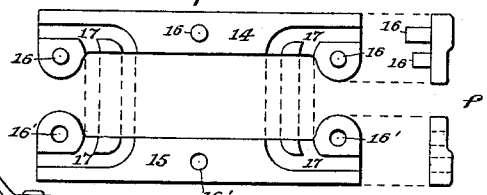
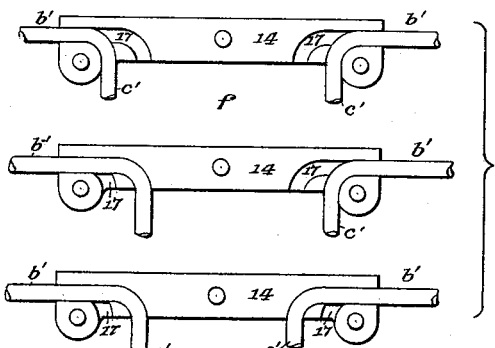
WITNESSES: INVENTORS:

(No Model.) 4 Sheets—Sheet 4.
E. A. & F. M. JEFFERY.
SPRING BED OR BED BOTTOM.

No. 332,081. Patented Dec. 8, 1885.

WITNESSES: INVENTORS:

UNITED STATES PATENT OFFICE.

EDWIN A. JEFFERY AND FRANK M. JEFFERY, OF JERSEY CITY, N. J.

SPRING BED OR BED-BOTTOM.

SPECIFICATION forming part of Letters Patent No. 332,081, dated December 8, 1885.

Application filed February 24, 1885. Serial No. 156,858. (No model.)

*To all whom it may concern:*

Be it known that we, EDWIN A. JEFFERY and FRANK M. JEFFERY, both citizens of the United States, and residents of Jersey City, in the county of Hudson and State of New Jersey, have jointly invented certain Improvements in Spring Beds or Bed-Bottoms, of which the following is a specification.

Our invention relates to that class of spring beds or bed-bottoms which are usually made entirely of metal, and comprise springs mounted on slats, which latter are connected together by distending links hinged on the slats. The springs are usually connected at their tops by means of chains or other flexible connectors, and the bed is capable of being rolled up for convenience of transportation.

Our object is to provide a light economically-constructed bed that may be readily adjusted as to width within sufficiently wide limits, and one which may be either rolled up or collapsed, as desired.

Our improvements will be fully hereinafter set forth, and the novel features of our invention carefully defined in the claims.

Figure 1:
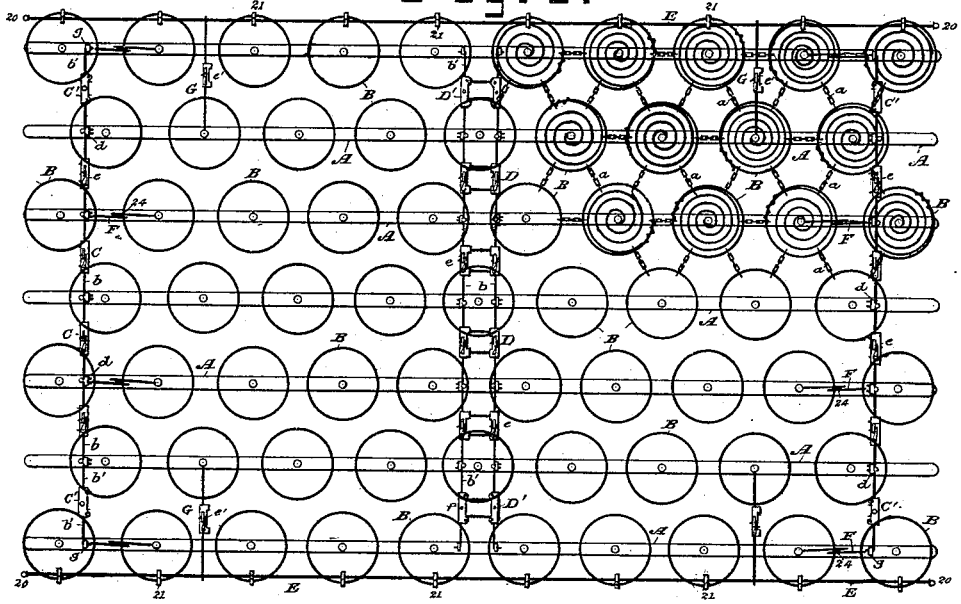
Figure 2:
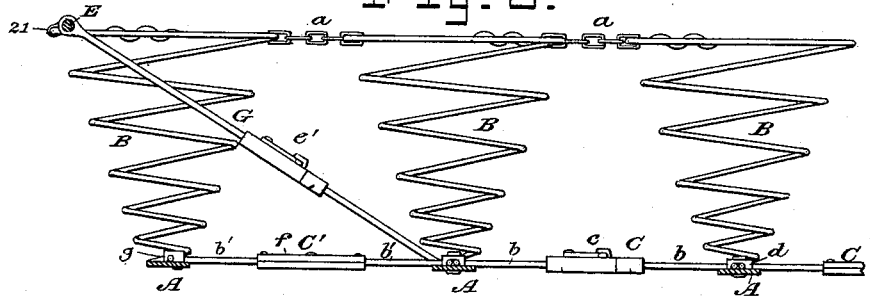
Figure 5:
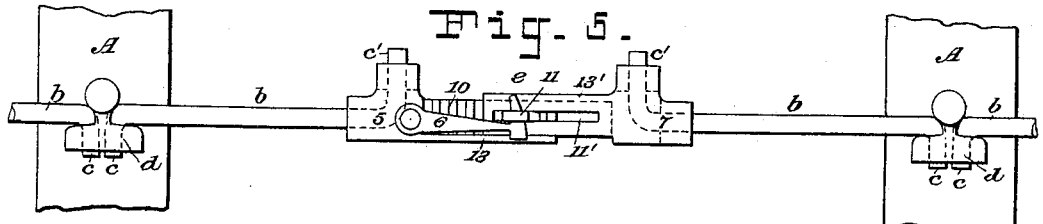
Figure 6:
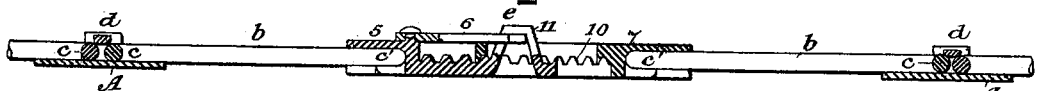
Figure 22:
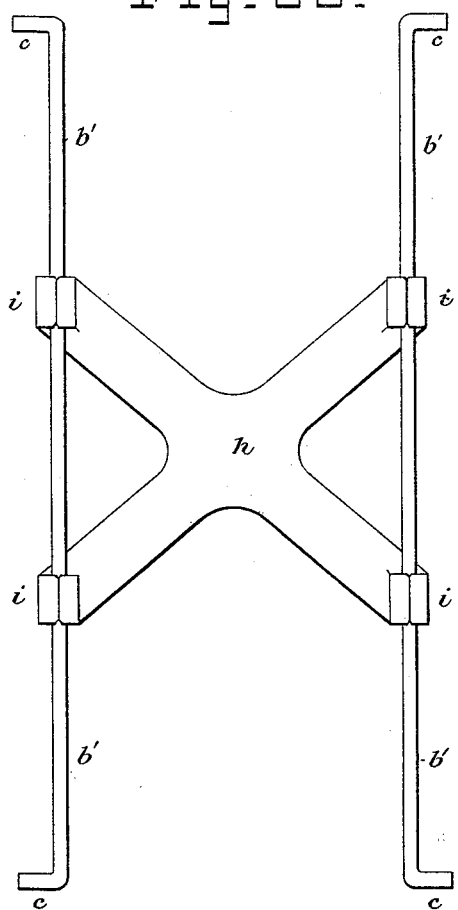
Figure 23:
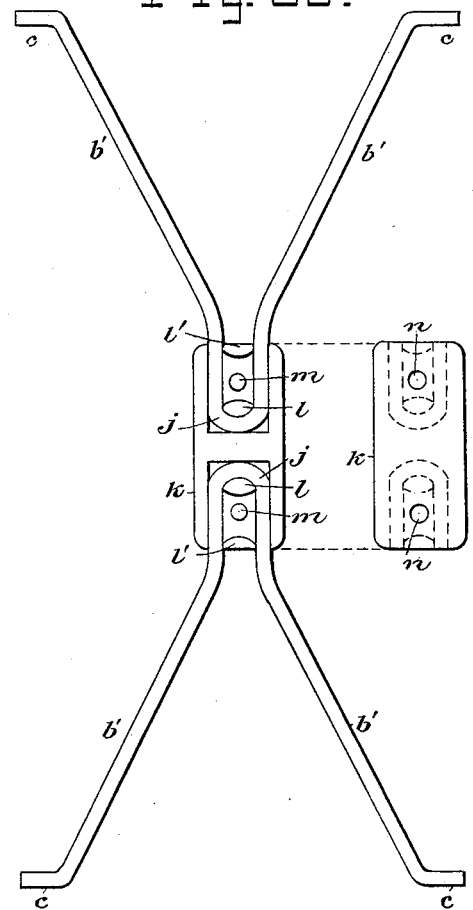
Figure 20:
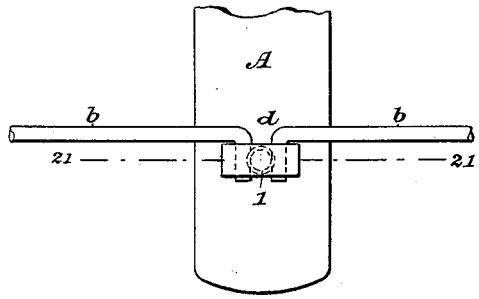
Figure 21:
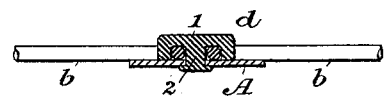

In the drawings which serve to illustrate our invention, Figure 1 is a plan of our improved spring-bed drawn to a small scale and with the minute details of construction omitted. Fig. 2 is an end elevation on a larger scale of a part of the end of a bed, illustrating the extensible brace for the top side bars. Figs. 3 and 4 are plan views illustrating, respectively, the slat-connecting links at the ends and middle of the bed. Fig. 5 is a plan of the adjustable and separable link between the slats, and Fig. 6 is a longitudinal vertical mid-section of the same. Figs. 7, 8, 9, 10, and 11, illustrate in detail the several parts of the coupling device for securing the two halves or elements of the slat-links. Figs. 12, 13, and 14 illustrate in detail the top side bar, its end cap or knob, and the malleable clip for securing it to the side row of springs. Fig. 15 is an elevation showing the elastic brace for the extreme end springs of the bed. Figs. 16 and 17 illustrate in detail the construction and application of the non-separable coupling for securing the two elements of a slat-link. Fig. 18 illustrates in detail the construction of the hinging clip, of malleable metal, for securing and hinging the slat-links to the intermediate slats; and Fig. 19 illustrates the clip for rigidly securing said links to the side or marginal slats. Figs. 20 and 21 illustrate in detail a slight modification of the clip shown in Fig. 18. Figs. 22 and 23 illustrate modifications of the construction of the non-separable links which we generally employ between the marginal or side slat and that next adjacent on both sides of the bed.

In all of the figures, A A represent the slats, which extend lengthwise of the bed, and which are usually made of thin flexible steel. B B are the springs mounted on these slats, and made in the usual way. These springs are connected at their tops by chains $a$ $a$ in a well-known way.

The above features are common in beds of this class, and in such beds it has been common also to connect the slats together with distancing-links hinged both on and between the slats; to provide a top side slat secured to the outer or marginal rows of springs, and to connect this top side slat to the second bottom slat by means of a diagonal brace. Therefore we do not claim, broadly, any of the above-described features.

Our improvements consist in a novel construction of extensible links, which we employ to connect the side slat to the adjacent intermediate slat; in a novel construction of extensible and separable links which we employ to connect the intermediate slats; in a novel hinging-clip and a novel non-hinging-clip for securing these links to the intermediate and side slats, respectively; in a novel construction of elastic brace for the end springs of the bed, and in a novel extension-brace for the top side bar; in a novel construction of top side bar, made from a wire or rod, and in a novel securing-clip for attaching said bar to the spring, and in certain minor novel details of construction that will be fully set forth hereinafter.

Referring to Fig. 1, it will be seen that the slats A are connected by three rows of links—namely, two rows of narrow links, C C', arranged near the ends of the slats, and one row of broad links, D D', arranged at the middle of the slats. These latter might be called "double links." This arrangement of the links may be varied without departing materially from our invention, and there may be more or less than three rows. The links C and D, between the intermediate slats, are designed to be not only adjustable as to length, (extensible,) but they may also be taken apart or uncoupled at their middles (separable) in order to render the bed collapsible. The links C' and D', between the side slat and the slat next adjacent, are usually adjustable as to length when constructed; but they cannot be or are not designed to be thereafter changed. Fig. 3 shows the narrow links C C' and Fig. 4 the double or broad links D D' more in detail. The relative constructions of the narrow and broad links are substantially the same; but the latter are doubles of the former, or like two narrow links arranged in pairs and connected member to member. Each narrow link C comprises in part two semi-links, $b$, of wire, provided with short attaching or hinging branches $c$ $c$, bent at right angles on their ends. The outer ends, $c$, of these semi-links are hinged to the slats by means of double hinging-clips $d$. (Shown in detail in the four views in Fig. 18, wherein the dotted lines show the positions of the hinging branches on the links.) This clip $d$ is made preferably of malleable iron, and comprises (see Fig. 18) an elongated stirrup-piece, 1, to take over and secure the branches $c$, but leave them free to turn, and an attaching-stud, 2, by which the clip is securely riveted to the slat A in the longitudinal axis of the latter. It will be seen that we make one hinging-clip $d$ serve for two links, the two links on the opposite sides of a slat being hinged at a common point on the slat.

In hinging the links to the slat they are first placed in position, the clip then placed in position over their branches $c$, with the stud 2 passing through a hole punched in the slat, and the riveting is then effected. The enlarged head of the riveting-stud 2 takes behind the semi-link at the bend, and prevents the branch $c$ from escaping by drawing out. This is essential in the narrow link formed of one wire. The two semi-links $b$ $b$ are joined at their opposed ends, between the slats, by the coupling $e$. (Seen in Fig. 3, but more in detail in the various views embodied in Figs. 7 to 11, inclusive.) Fig. 7 shows the under side of the coupling, and Fig. 8 illustrates the mode of securing the malleable parts of the same to the wires of the link by clinching down its clips on the wire. Fig. 9 shows, first, a plan of the lower plate, 5; second, a side elevation of same; third, a view of the under side of same, and, fourth, a plan and end view of the securing-hook $b$. Fig. 10 shows, first, a plan of the cap-plate 7; second, a side elevation of same; third, a view of its under side. Fig. 11 is a cross-section on line 11 11 in Fig. 7. The plate 5 has an L-shaped recess, 8, in its end to receive the end of the semi-link $b$ and clips 9, to be clinched down over the wire, as in Fig. 8, to secure the link $b$ firmly to 5. Plate 5 is provided also with a toothed or corrugated upper surface, 10, a raised loop or eye, 11, a stud, 12, on which is mounted hook 6, which is secured (to swing) by riveting, and, by preference, a raised side flange, 13.

The cap-plate 7, Fig. 10, is constructed very similar to the bottom plate, 5, but in reverse. It has a corrugated lower face, 10', a recess, 8', clips 9', side flanges 13', and a slot, 11', through which the raised loop 11 projects when the plates 5 and 7 are fitted together. Figs. 5 and 6 illustrate very clearly how the parts 5, 6, and 7 of the coupling $e$ are put together. Plate 7 rests on plate 5, the corrugations on the two intermeshing, and the side flanges forming lateral guides. The loop 11 projects up through slot 11', and the hook 6 engages the loop 11, where it projects above plate 7, thus forming a lock or fastening. As the hook 6 is pivoted on the same part that bears loop 11, they will always engage of necessity. The separation or uncoupling of the two parts of the link is effected by simply disengaging the hook, when the semi-links may be turned upon their hinges, and the slats be brought together, as in any collapsible bed. The extension is effected by disengaging the hook and making the corrugated faces 10 10' engage or intermesh at the proper points, as will be readily understood. Figs. 5 and 6 show the link fully extended. The hook 6 keeps the corrugated faces in mesh, and these latter prevent the plates from slipping on each other.

The links C' comprise two semi-links, $b'$, of wire, in all respects similar to the same members of link C. These semi-links $b'$ are connected between the slats by a non-separable coupling, $f$, which is fully illustrated in Figs. 16 and 17, the latter figure being designed to illustrate the three degrees of extension of which this fastening device is capable.

In Fig. 16, 14 is the bottom plate and 15 is the top plate. These plates are alike, but reversed. 16 are riveting-studs cast on plate 14, and 16' are holes in plate 15, to receive said studs when the plates are riveted together. 17 represents forked grooves or recesses in the juxtaposed faces of the plates to receive the bent ends of the semi-links $b'$, which are thus clamped between said plates and firmly held. When the links are placed in the outer forks of grooves 17, as in the upper view, Fig. 17, the link is fully extended. When one semi-link is placed in the outer and the other in the inner fork of the grooves 17, as in the middle view, Fig. 17, the link is half extended, and when both semi-links are placed in the inner forks of grooves 17, as in the lower view, Fig. 17, then the link is of normal length. This extension is effected once for all when the bed is constructed.

As it is not desirable that the link shall be hinged to the marginal slat of the bed, we provide a malleable clip, $g$, to secure this end. This clip is shown in detail in Fig. 19, where the upper view is a side elevation and the lower view a plan of its under side. The clip is usually square in plan, and it has in its under side an L-shaped groove, 18, to receive the wire of the link, and a stud, 19, which passes through a hole in the side slat, and is riveted down.

As we have before stated, the broad links D and D' differ from the narrow links C C', respectively, only in being double; consequently in Fig. 4 we have used the same letters of reference for the members of the link that are used in Fig. 3. The branches c', however, extend across and are united to form tie-rods c''. In fact, as will be seen, we form the semi-links for links D and D' of U-shaped bent wires. If these ties c'' were removed, each broad link would form two narrow links.

In order to show the construction more clearly, we have omitted from the left side of the links in Fig. 4 the hinging-clips d, (in the main,) the cap-plates of couplings f, and the clip g, that secures the link to the marginal slat. These are all shown in place on the right side of Fig. 4.

Heretofore it has been customary to construct the top side slat of a spring-bed of a thin flat steel strip similar to the bottom slats, A. We make this element of the bed of a metal rod or wire, and attach it to the marginal springs by malleable clips.

Referring to Figs. 3, 12, 13, and 14, E is the top side bar, constructed of a cylindrical metal rod, usually of steel, on the ends of which we mount socket-knobs or end caps, 20, to form a finish. These may be fastened by clinching, by soldering, or by any equivalent means, and their function is to prevent the bedding from being torn in catching on the ends of the bars. Fig. 12 shows this tip 20 in section.

Fig. 13 shows the clip 21 for attaching the bar E to the spring in elevation and plan. This clip we usually make of malleable iron, and it is provided with clinches 22 to embrace the bar E, and clinches 23 to embrace the wire of the spring.

Fig. 14 shows the clip 21 as in use, the wire of the spring and the bar E in cross-section, and the clinches hammered down. This bar performs all the functions of the ordinary top side slat, and is much lighter and neater.

Fig. 3 shows in plan and Fig. 15 in elevation the elastic brace F, which supports the extreme end springs of the bed. There is a brace, F, for each end spring of the bed. It consists of a steel wire with an eye formed in one end to receive a rivet, whereby it is secured at its lower end to the slat, an eye in the other end whereby it is secured to the top of the spring, (see Fig. 15,) and a spiral loop, 24, formed near its middle to impart the necessary elasticity when a strain is brought upon it tending to compress it. This brace stands diagonally, as shown, and its foot is secured to the same slat upon which the spring it braces is mounted.

We make no claim herein to this brace F, as similar braces have before been used in spring-beds.

Fig. 2 illustrates the extensible brace G, which supports or braces the top side bar, E.

This brace is almost identical in construction with the narrow link C, and will need but a brief description. It is formed of two wires or rods connected by an extension-coupling device, e', which is exactly like the coupling device e before fully described. The upper end of the brace G is fastened in any way to the bar E. At its foot it is secured to the second slat A, also in any convenient way. This attachment may be effected by a clip precisely like the clip g before described.

In Figs. 20 and 21 we show in plan and section, respectively, a slightly-modified form of the hinging-clip d. In this construction the riveting-stud is set in the center and between the hinging branches of the links. This form of clip is not so satisfactory for the narrow links as the one illustrated in Fig. 18, as no provision is made for preventing the hinging branches of the links from drawing out; but this cannot take place with the broad links, and we prefer to use it with them, as the draft is more nearly direct, and the riveting-stud is not so apt to rotate in its bearing in the slat as is that on the clip shown in Fig. 18.

Figs. 22 and 23 illustrate modifications of the broad link D'. In Fig. 22, which shows a non-extensible link, the wire rods b' extend parallel from slat to slat, and are connected rigidly by an X-shaped tie-piece, h, of malleable iron, provided with clinching-clips i i, which are clinched down over the rods b', as clearly shown. In Fig. 23 the semi-links b' are bent into a Y shape, and the loops j thus formed in them are clamped between two plates of malleable iron, k k, which form the coupling. In the figure the cap-plate is shown as lifted off. In both plates are formed recesses to receive the loop on the wire, and at each end are projections or elevations l l' in said recesses, around one of which the loop j of the wire takes in order to prevent any endwise movement tending to lengthen or shorten the link. The loop in the wire may be set, once for all, to engage either of the projections l or l', in order to vary the length of the link, precisely as in the coupling f. (Shown in Figs. 16 and 17, and fully described). Studs m m, cast on the lower malleable plate k, pass through holes n n in the upper plate, and are riveted down firmly, thus forming a rigid coupling for the link.

In lieu of casting studs on the malleable parts of the several couplings described, we may of course in some cases form holes in both parts and use an ordinary rivet for fastening the parts together. We may also vary the arrangement of the two forms of couplings e and f from that shown without materially departing from our invention.

We have shown our bed as we prefer to construct it as a whole; but it is obvious that some of its features might be employed without the others.

We reserve to ourselves the employment of all known equivalents of our invention.

The object in making the links between the slats separable is to permit each slat, with its springs, to be separated from the others, so that they may pack closely for shipping beds in quantities, and the object in making the braces G extensible is to adjust them to the space between the marginal and next adjacent slat. The coupling employed may be constructed like the coupling $f$, if desired, but we prefer the construction described. The elastic brace F is only needed to brace the extreme end springs on alternate slats. These, being braced, will support the inner springs, to which they are connected by chains A. The flat side rails or slats usually mounted on top of the marginal springs are apt to cut and tear the bedding which is tucked in about them. Our smooth cylindrical side bars, E, provided with spherical socket-knobs on their ends, are designed to obviate this defect.

Any equivalent mode of securing the wire links $b$ to the parts of the coupling $e$ may be employed in lieu of the clinching-clips described—as, for example, they may be clamped between two riveted plates, as the wire links $b$ are clamped in the coupling $f$.

We are aware that it has been proposed to mount a cylindrical rod at the side of a spring-bed and secure it at a point about half-way between the spring-slat and the tops of the springs by means of curved wire springs attached at their one ends to the top coils of the springs and at their other ends to the spring-slats. This we do not claim, as it is not designed to perform the functions of a top side bar. Our bar E rests on the tops of the side row of springs, and is secured to the spring by a peculiarly-constructed clip, 21. (Clearly shown in Figs. 13 and 14.) In these views it will be seen that the clinches 22 for the bar project upward at one end of the clip, and the clinches 23 for the bed-spring project downward at the other end. This construction we believe to be novel.

Having thus described our invention, we claim—

1. A spring bed or bed-bottom having the slats upon which the springs are mounted connected together by distancing-links, the said links being made in two parts hinged to the slats and detachably coupled together between the slats, whereby the slats may be rigidly distanced when the bed is in use, and yet be readily separated, substantially as described.

2. The coupling $e$, for the slat-connecting link, comprising the plate 5, provided with corrugations 10, a loop, 11, and a hook, 6, and the plate 7, provided with corrugations 10', and a slot, 11', said plates being also provided with means, substantially as described, for attaching them to the wires of the link, all substantially as set forth.

3. The combination, to form a slat-connecting link for a spring-bed, of the wire semi-links $b$ $b$, having hinging and attaching branches bent on their ends, the plate 5, provided with a loop, 11, a hook, 6, a corrugated face, and means, substantially as described, for securing it to the link, and the plate 7, provided with a slot, 11', for the loop 11, a corrugated face, and means, substantially as described, for attaching it to the link, said plates being secured rigidly to the links to form an extensible but rigid coupling, substantially as and for the purposes set forth.

4. The combination, to form a broad or double slat-connecting link for a spring-bed, of the U-shaped semi-links of wire, of which the portions $c''$ $c''$ form the connecting tie-pieces, and the two couplings which unite the semi-links between the slats, substantially as set forth.

5. An extensible slat-connecting link for a spring-bed, comprising the semi-links of wire $b'$ $b'$, and the coupling uniting said semi-links, consisting of the plates 14 and 15, provided with the forked recesses 17, to receive the attaching branches on the semi-links, and studs and holes for riveting the plates together, substantially as described.

6. The combination, with the marginal slat and a slat-connecting link, $b'$, having an attaching branch bent on its end, of the securing-clip $g$, provided with a groove, 18, in its lower face to receive the end of the link, and a riveting-stud, 19, substantially as shown and described.

7. The combination, with slat and the links provided with hinging branches formed on their ends, of the hinging-clip $d$, provided with a stirrup or keeper, 1, to take over the hinging-branches $c$, bent on the links, and a riveting-stud, 2, substantially as shown and described.

8. The combination, with the slat and the link provided with hinging branches, of the hinging-clip provided with a stirrup or keeper to take over said hinging branches, and a riveting-stud the head of which is constructed and arranged, as shown, to take behind the bend or shoulder of the link and prevent the hinging branch from drawing out of the clip, as described.

9. The combination, with the side row of springs of the bed, of the cylindrical bar E, mounted on the tops of the said springs, substantially as described, and the clip 21, provided with clinches 22 and 23, for securing the said bar to the springs, substantially as set forth.

10. In a spring-bed, the combination, with the top side bar and a slat, A, of the extensible brace G, comprising two wires or rods and a coupling, $e'$, constructed substantially as described, whereby said brace may be conveniently lengthened and shortened, as set forth.

11. The combination, to form a link for connecting the slats of a spring-bed, of the bent wire semi-links $b$ $b$, the plate 5, provided with a hinged hook, 6, a recess, 8, clips 9 9, corrugations 10, loop 11, and side flange 13, and the plate 7, provided with the recess 8', clips 9' 9', corrugations 10', slat 11', and side flange 13', all constructed and arranged to operate as set forth.

12. A spring-bed wherein the slats which bear the springs are connected at or near their ends by narrow extensible and separable links C, constructed substantially as described, and at or near their middles by broad extensible and separable links D, constructed substantially as described.

13. The combination, in a spring-bed, of the slats A, the non-separable links C' and D', arranged to connect the marginal slats with those next adjacent, and the separable links C and D, arranged to connect the intermediate slats, said links being hinged on the intermediate slats and fixed rigidly to the marginal slats, substantially as herein set forth.

In witness whereof we have hereunto signed our names in the presence of two subscribing witnesses.

EDWIN A. JEFFERY.
FRANK M. JEFFERY.

Witnesses:
HENRY CONNETT,
ARTHUR C. FRASER.